United States Patent
Oh et al.

(10) Patent No.: US 10,384,946 B2
(45) Date of Patent: Aug. 20, 2019

(54) LOW-DUST, HIGH INSULATION AEROGEL BLANKET AND METHOD FOR PRODUCING THE SAME

(71) Applicant: LG CHEM, LTD., Seoul (KR)

(72) Inventors: Kyoung Shil Oh, Daejeon (KR); Je Kyun Lee, Daejeon (KR); Sung Min Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/765,136

(22) PCT Filed: Oct. 10, 2017

(86) PCT No.: PCT/KR2017/011124
§ 371 (c)(1),
(2) Date: Mar. 30, 2018

(87) PCT Pub. No.: WO2018/070755
PCT Pub. Date: Apr. 19, 2018

(65) Prior Publication Data
US 2018/0312407 A1 Nov. 1, 2018

(30) Foreign Application Priority Data
Oct. 12, 2016 (KR) .................. 10-2016-0132168

(51) Int. Cl.
*C01B 33/158* (2006.01)
*C01B 33/159* (2006.01)
(Continued)

(52) U.S. Cl.
CPC ............ *C01B 33/1585* (2013.01); *B05D 1/18* (2013.01); *B05D 3/00* (2013.01); *B05D 7/02* (2013.01);
(Continued)

(58) Field of Classification Search
CPC ....... C01B 33/00; C01B 33/113; C01B 33/12; C01B 33/14; C01B 33/146; C01B 33/148;
(Continued)

(56) References Cited

U.S. PATENT DOCUMENTS

| 5,789,075 A | 8/1998 | Frank et al. |
| 6,068,882 A * | 5/2000 | Ryu .................. C04B 14/302 |
| | | 427/246 |

(Continued)

FOREIGN PATENT DOCUMENTS

| CN | 103848638 | 6/2014 |
| CN | 104556969 | 4/2015 |

(Continued)

OTHER PUBLICATIONS

Supplementary Search Report of European Patent Office in Appl'n. No. 17851868, dated Sep. 17, 2018.
(Continued)

*Primary Examiner* — Maria V Ewald
*Assistant Examiner* — Ethan A. Utt
(74) *Attorney, Agent, or Firm* — Dentons US LLP

(57) ABSTRACT

The present invention relates to a low-dust, high insulation aerogel blanket and a method for producing the same. More specifically, the present invention provides a method for producing a low-dust, high insulation aerogel blanket, wherein a plate type $Mg(OH)_2 \cdot MgO \cdot SiO_2$ powder is added to a silica sol, thereby being capable of reducing the generation of dust with excellent flame retardancy and thermal conductivity, and an aerogel blanket produced thereby.

11 Claims, 2 Drawing Sheets

(51) Int. Cl.
*D06M 11/44* (2006.01)
*D06M 11/45* (2006.01)
*D06M 11/79* (2006.01)
*D06M 13/507* (2006.01)
*D06M 15/643* (2006.01)
*D06M 23/08* (2006.01)
*D06M 23/10* (2006.01)
*B05D 7/02* (2006.01)
*B05D 1/18* (2006.01)
*B05D 3/00* (2006.01)
*D06M 13/513* (2006.01)
*D06M 13/517* (2006.01)
*F16L 59/02* (2006.01)
*B05D 3/10* (2006.01)

(52) U.S. Cl.
CPC .......... *C01B 33/158* (2013.01); *C01B 33/159* (2013.01); *D06M 11/44* (2013.01); *D06M 11/45* (2013.01); *D06M 11/79* (2013.01); *D06M 13/507* (2013.01); *D06M 13/513* (2013.01); *D06M 13/517* (2013.01); *D06M 15/643* (2013.01); *D06M 23/08* (2013.01); *D06M 23/105* (2013.01); *F16L 59/026* (2013.01); *F16L 59/028* (2013.01); *B05D 3/105* (2013.01); *D06M 2200/30* (2013.01); *D06M 2400/02* (2013.01)

(58) Field of Classification Search
CPC ... C01B 33/149; C01B 33/152; C01B 33/154; C01B 33/157; C01B 33/158; C01B 33/1585; C01B 33/159; C01B 33/16; C01B 33/163; C01B 33/166; C01B 33/1415; C01B 33/1417; C01B 33/145
USPC ..... 423/324–340, 592.1, 593.1, 600, 594.16, 423/635; 516/20, 31, 34
See application file for complete search history.

(56) References Cited

U.S. PATENT DOCUMENTS

| | | | |
|---|---|---|---|
| 8,021,583 B2 | 9/2011 | Rouanet et al. | |
| 2007/0004306 A1* | 1/2007 | Leeser | B32B 5/02 442/394 |
| 2007/0185248 A1 | 8/2007 | Qian et al. | |
| 2007/0272902 A1* | 11/2007 | Evans | C09K 21/02 252/600 |
| 2008/0054221 A1* | 3/2008 | Maddan | C01B 13/36 423/335 |
| 2008/0081014 A1 | 4/2008 | Ahn et al. | |
| 2009/0029147 A1* | 1/2009 | Tang | B32B 27/40 428/221 |
| 2009/0244709 A1 | 10/2009 | Suzuki et al. | |
| 2011/0143139 A1* | 6/2011 | Maddan | C01B 13/36 428/402 |
| 2018/0010726 A1 | 1/2018 | Kim et al. | |

FOREIGN PATENT DOCUMENTS

| | | |
|---|---|---|
| JP | 2009-258711 | 11/2009 |
| JP | 2010174120 | 8/2010 |
| KR | 10-0385829 | 10/2003 |
| KR | 10-2011-0126381 | 11/2011 |
| KR | 10-2016-0100082 | 8/2016 |
| WO | 2006/002440 | 1/2006 |
| WO | 2016129874 | 8/2016 |

OTHER PUBLICATIONS

Office Action of Korean Patent Office in Appl'n. No. 10-2016-0132168 dated Aug. 3, 2018.
XP-002784505, Database WPI Week 201553, Thomson Scientific, AN2015-40083K—Summary of Application No. CN20141838655, published as CN104556969 (2017).
XP-002784506, Database WPI Week 201455, Thomson Scientific, AN2014-P86721—Summary of Application No. CN20121501354, published as CN103848638 (2017).
International Search Report and the Written Opinion of PCT/KR2017/011124, dated Jan. 18, 2018.

* cited by examiner

LOW-DUST, HIGH INSULATION AEROGEL BLANKET AND METHOD FOR PRODUCING THE SAME

CROSS-REFERENCE TO RELATED APPLICATIONS

This application is a National Stage Application of International Application No. PCT/KR2017/011124 filed on Oct. 10, 2017, which claims priority to and the benefit of Korean Patent Application No. 10-2016-0132168, filed on Oct. 12, 2016, in the Korean Intellectual Property Office, both of which are incorporated herein in their entirety by reference for all purposes as if fully set forth herein.

TECHNICAL FIELD

The present invention relates to a low-dust, high insulation aerogel and a method for producing the same.

BACKGROUND ART

An aerogel is a superporous, high specific surface area (≥500 m²/g) material having a porosity of about 90 to 99.9% and a pore size in the range of 1 to 100 nm, and is a material excellent in ultra-light weight, super insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively performed.

The biggest advantage of the aerogel is that the aerogel has a super-insulation exhibiting a thermal conductivity of 0.03 W/m·K or less, which is lower than that of an organic insulation material such as conventional Styrofoam, and that fire vulnerability and the occurrence of harmful gases in case of fire which are fatal weaknesses of the organic insulation material can be solved.

Meanwhile, since such an aerogel has a very low mechanical strength due to a porous structure, an aerogel composite bonded by impregnating the aerogel with a fabric blanket has been developed. The aerogel blanket is flexible and can bend, fold or cut in any size or shape, and is easy to handle. Therefore, the aerogel blanket is used not only for industrial uses such as insulation panels for LNG carriers, industrial insulation materials and spacesuits, transportation and automobiles, insulation materials for electric power production, but also for daily necessities such as jackets and sports shoes.

Aerogels are generally produced through the steps of producing, gelling, aging, surface modifying and drying a silica sol. Conventionally, in order to improve the insulation and fire prevention characteristics of the aerogel blanket, an additive such as a metal hydroxide-based flame retardancy is used for reducing radiative conductivity in the silica sol production step and improving flame retardancy performance.

However, due to adding the additive, the $SiO_2$ bond was weakened to reduce an adhesive force between a blanket substrate and an aerogel, thereby increasing the generation of dust. When the aerogel blanket was applied to a pipe or the like, the aerogel was continuously separated from the blanket substrate due to vibration of the pipe, so that the aerogel separation phenomenon was further deteriorated due to the use of the additive.

In order to solve the problem, U.S. Pat. No. 8,021,583 B2 has tried to produce aerogel granules or powders to fill them between fibers in the form of slurry, thereby reducing the generation of dust, but there was a problem that the thermal conductivity was increased due to a binder or the like, compared with a gel casting method.

Accordingly, the inventors of the present invention have invented a method for producing a low-dust, high insulation aerogel blanket capable of reducing the generation of dust while having excellent flame retardancy and thermal conductive performance, and a low-dust, high insulation aerogel blanket produced thereby.

PRIOR ART DOCUMENT (Patent Document 1) U.S. Pat. No. 8,021,583 B2 (Sep. 20, 2011)

DISCLOSURE OF THE INVENTION

Technical Problem

An aspect of the present invention provides a method for producing a low-dust, high insulation aerogel blanket, wherein the method is provided in which a plate type $Mg(OH)_2 \cdot MgO \cdot SiO_2$ powder is added to the silica sol, thereby being capable of reducing the amount of dust generation while having excellent flame retardancy and thermal conductive performance.

Another aspect of the present invention provides a low-dust, high insulation aerogel blanket produced by the production method described above.

Technical Solution

According to an aspect of the present invention, there is provided a method for producing an aerogel blanket, the method including the steps of: 1) mixing a silica precursor, water, and alcohol to prepare a silica sol; 2) adding an additive represented by Formula 1 below to the silica sol; 3) mixing a basic catalyst with the silica sol mixed with the additive and then impregnating a blanket substrate; 4) performing a gelation reaction of the silica sol in a state the silica sol is impregnated into the blanket substrate; and 5) thereafter, performing surface modifying and drying, $$M(OH)_x \cdot M_yO_z \cdot SiO_2 \qquad \text{[Formula 1]}$$

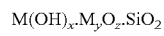

(wherein M is at least one metal element selected from the group consisting of Mg, Ca and Al, and x, y and z are positive integers of 3 or less).

In addition, the present invention provides an aerogel blanket produced by the above production method

Advantageous Effects

A method for producing an aerogel blanket according to the present invention has an effect to reduce the generation of dust while increasing flame retardancy and insulation performance by adding a plate type $Mg(OH)_2 \cdot MgO \cdot SiO_2$ powder to silica sol as an additive.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A silica aerogel blanket indicates that a silica aerogel material as a blanket substrate is compounded with fabrics or the like to be made into a mattress or sheet form, wherein the silica aerogel blanket has flexibility to be able to bend, fold, and cut. The silica aerogel imparts insulation, and the blanket substrate such as fabrics serves to enhance the flexibility and mechanical strength of the silica aerogel blanket.

Such a silica aerogel blanket is a new material superior in heat resistance and insulation to poly-styrofoam or polyurethane foam which is a conventional polymer insulation material, which has attracted attention as a high-tech material capable of solving the energy saving and environmental problems developed in the future. Accordingly, the silica aerogel blanket is useful as an insulation material, a lagging material, or a nonflammable material which is used not only for a plant facility for heat and cold insulation such as piping and industrial furnaces for various industrial facilities but also for an aircraft, a ship, an automobile, a building structure and the like.

In addition, in order to improve various performance of the aerogel blanket, it has been tried to produce an aerogel blanket with excellent performance by using various additives in the production process.

The present invention is based on the above-mentioned attempts, and the present invention provides a method for producing an aerogel blanket capable of obtaining excellent insulation performance while solving the problem in which the addition of a conventionally used flame retardant has caused the generation of dust to increase.

Figure 1:
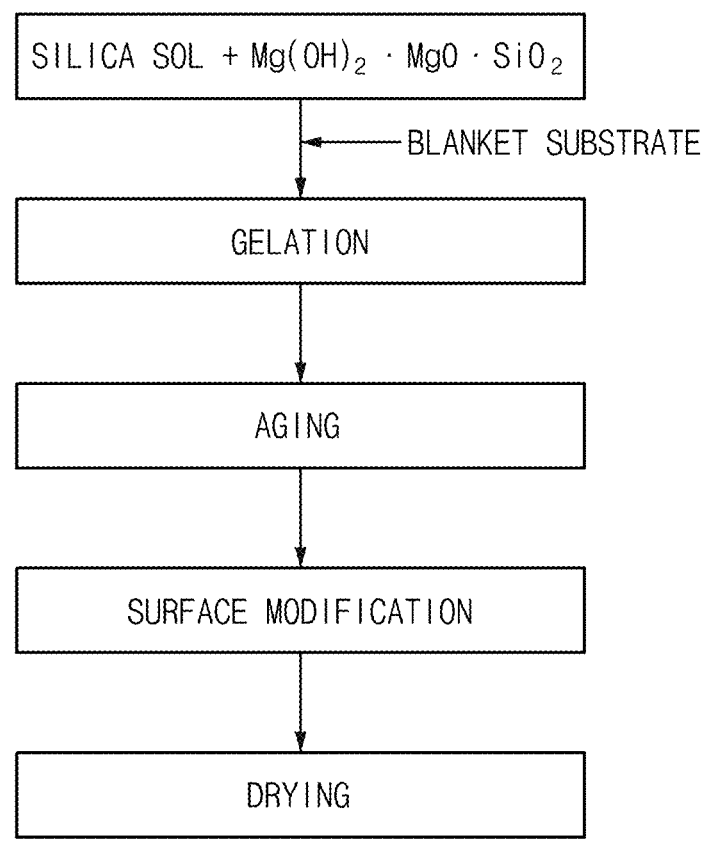
FIG. 1 is a flow chart schematically illustrating a method for producing an aerogel blanket according to an embodiment of the present invention.

Hereinafter, a method for producing an aerogel blanket according to an embodiment of the present invention will be described in detail with reference to FIG. 1.

A method for producing an aerogel blanket according to an embodiment of the present invention includes: 1) mixing a silica precursor, water, and alcohol to prepare a silica sol; 2) adding an additive represented by Formula 1 below to the silica sol; 3) mixing a basic catalyst with the silica sol mixed with the additive and then impregnating a blanket substrate; 4) performing a gelation reaction of the silica sol in a state the silica sol is impregnated into the blanket substrate; and 5) thereafter, performing surface modifying and drying,

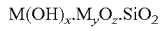  [Formula 1]

(wherein M is at least one metal element selected from the group consisting of Mg, Ca and Al, and x, y and z are positive integers of 3 or less).

Step 1) is a step of producing a silica sol, wherein the silica sol may be produced by mixing a silica precursor, water, and alcohol.

Specifically, the silica precursor may be used in an amount such that silica content contained in the silica sol becomes 0.1 wt % to 30 wt %. While the silica precursors may have slightly different contents depending on the type thereof, when the silica content is less than 0.1 wt %, the content of the silica aerogel in the finally produced blanket may be too low to achieve the desired insulating effect; when exceeding 30 wt %, the excessive formation of the silica aerogel may cause the mechanical properties, particularly the flexibility, of a blanket to be deteriorated.

The silica aerogel usable in the preparation of the silica sol may be a silicon-containing alkoxide-based compound, and specifically, may be tetraalkyl silicate such as tetramethyl orthosilicate (TMOS), tetraethyl orthosilicate (TEOS), pre-hydrolyzed tetraethyl orthosilicate (Pre-hydrolyzed TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate.

In addition, the alcohol usable in the preparation of the silica sol may be specifically monohydric alcohol such as methanol, ethanol, isopropanol, and butanol; or polyhydric alcohol such as glycerol, ethylene glycol, propylene glycol, diethylene glycol, dipropylene glycol, and sorbitol, and at least any one or two mixtures thereof may be used. Considering miscibility with water and an aerogel among them, the alcohol may be monohydric alcohol having 1 to 6 carbon atoms such as methanol, ethanol, isopropanol, and butanol.

The alcohol (polar organic solvent) described above may be used in an appropriate amount in consideration of the degree of hydrophobicity in the silica aerogel to be finally produced while promoting the surface modification reaction.

Step 2) according to an embodiment of the present invention is a step of adding an additive to the silica sol, and specifically, may a step of adding an additive represented by Formula 1 below,

  [Formula 1]

(wherein M is at least one metal element selected from the group consisting of Mg, Ca and Al, and x, y, and z are positive integers of 3 or less, more specifically, x is 2 or 3, y is 1 or 2, and z is 1 or 3).

More specifically, the additive according to an embodiment of the present invention may be $Mg(OH)_2MgO.SiO_2$.

Conventionally, in order to improve the fire prevention characteristic of the aerogel blanket, an additive such as a metal hydroxide-based flame retardant has been used in the step of producing the silica sol.

However, there is a problem that the $SiO_2$ bond is weakened by the additive and the adhesive force between the blanket substrate and an aerogel is reduced to increase dust generation. When the aerogel blanket is applied to piping and the like, the problem of dust generation was further deteriorated due to the vibration of the piping.

The present invention is intended to solve the above problems, and also improves the insulation performance while obtaining the characteristics of flame retardancy and low dust by the addition of the additive according to the present invention.

In addition, the additive of the present invention contains $SiO_2$ in the compound to bring an effect to additionally add the silica precursor, and thus the aerogel density of the aerogel blanket is increased to decrease thermal conductivity, thereby being capable of increasing the insulation performance of the aerogel blanket finally.

In addition, the additive powder according to an embodiment of the present invention is characterized to be a plate type.

The plate type additives cross each other, so that there is an effect in that the generation of dust may be remarkably reduced in comparison with an aerogel blanket which adds a conventional flame retardant or an additive powder of the present invention having another form such as a spherical shape and the like.

The additive according to an embodiment of the present invention may be added in an appropriate amount in order to maximize the effects of the present invention such as excellent flame retardancy and insulation performance, and low dust generation.

Specifically, the additive of the present invention may be used in an amount of 2.5 to 20 parts by weight, based on 100 parts by weight of the silica precursor.

When the additive used is added in an excessively small amount as less than 2.5 parts by weight, based on 100 parts by weight of the silica precursor, the effect of improving the flame retardancy and insulation performance to be obtained by the present invention may be insignificant; when being added in an excessive amount as more than 20 weight parts by weight, the additive of the plate type crosses each other excessively, and the aerogel is not uniformly distributed over the blanket as a whole, so that the insulation effect may be reduced in a portion in which the additive is agglomerated by crossing excessively.

Step 3) according to an embodiment of the present invention is a step of producing a silica aerogel-impregnated composite, which may be performed by impregnating a blanket substrate after the basic catalyst is added to the silica sol.

The basic catalyst usable in order to produce a silica gel of the present invention serves to increase the pH of the silica sol to promote the gelation.

The basic catalyst may include an inorganic base such as sodium hydroxide and potassium hydroxide; or an organic base such as ammonium hydroxide, but in the case of the inorganic base, metal ions contained in the compound may be coordinated to a Si—OH compound, and thus the organic base may be preferable. Specifically, the organic base may include ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, colin, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy)ethanol, 1-amino-2-propanol, triethanolamine, monopropanolamine, or dibutanolamine, and at least one or two mixtures thereof may be used. More specifically, the base of the present invention may be $NH_4OH$.

The basic catalyst may be included in an amount such that the pH of the silica sol becomes 4 to 8. When the pH of the silica sol exceeds the above range, gelation is not easy, or the gelling rate may too low, thereby deteriorating the processablity. In addition, since the base may be precipitated when being added in the form of a solid, it may be preferable to be added in the form of a solution diluted with the alcohol (a polar organic solvent).

The blanket substrate usable in the present invention may be a film, a sheet, a net, a fiber, a porous body, a foam, a nonwoven fabric, or a laminate including two or more layers. Further, depending on the use thereof, the blanket substrate may be formed with a surface roughness on a surface thereof or have a patterned surface. More specifically, the blanket substrate may be a fiber capable of further improving the insulation performance by including spaces or voids in which the silica aerogel is easily inserted into the blanket substrate. Also, the blanket substrate may preferably have a low thermal conductivity.

Specifically, the blanket substrate may be polyamide, polybenzimidazole, polyaramid, acrylic resin, phenol resin, polyester, polyether ether ketone (PEEK), polyolefin (e.g., polyethylene, polypropylene or copolymers thereof, etc.), cellulose, carbon, cotton, wool, hemp, nonwoven fabric, glass fiber or ceramic wool, and more specifically, the blanket substrate may include glass fiber or polyethylene.

Step 4) according to an embodiment of the present invention is a step of producing a silica gel composite, in which the silica sol mixed with the basic catalyst may be subjected to a gelation reaction in a state in which the silica sol is impregnated into the blanket substrate.

The gelation in the method for producing a silica aerogel blanket according to an embodiment of the present invention may be to form a network structure from a silica precursor material, and the network structure may be a planar mesh structure in which specific polygons having one or more types of atomic arrangement are linked to each other, or a structure in which specific polyhedrons share their vertices, edges, faces, etc., with each other to form a three dimensional skeleton structure.

The gelation of the silica sol may occur in a state in which the silica sol is impregnated into the blanket substrate.

Specifically, the impregnation may be carried out in a reaction vessel capable of accommodating the blanket substrate, and may be performed by pouring the silica sol into the reaction vessel, or placing and wetting the blanket substrate filled with the silica sol into the reaction vessel. In this case, in order to improve the bonding between the blanket substrate and the silica sol, the blanket substrate may be pressed slightly to be sufficiently impregnated. Hereinafter, the blanket substrate is pressed to a certain thickness at a constant pressure, so that an excess silica sol may be removed to reduce the subsequent drying time.

In addition, a production method according to an embodiment of the present invention may further include, after step 4), a step of performing an aging.

The aging is a step of leaving the silica gel at an appropriate temperature to complete a chemical change, which may be performed by leaving the silica gel for 10 hours at 50 to 90° C. in the solution in which a basic catalyst such as ammonia is diluted with an organic solvent to a concentration of 1 to 10%. The present invention performs the aging step, thereby being capable of forming the formed network structure more firmly, so that mechanical stability may be enhanced.

In addition, step 5) according to an embodiment of the present invention is a step of producing a hydrophobic aerogel blanket, which may be performed by surface-modifying and drying the prepared silica wet gel composite.

The dried silica aerogel maintains a low conductivity just after drying, but has a disadvantage in that moisture in the air is absorbed due to the hydrophilicity of silanol group (Si—OH) on the surface of silica to gradually increase thermal conductivity, and there is a problem that pores are severely collapsed during the drying step, making it difficult to expect the spring back phenomenon, so that a super-insulation product having a meso pore is difficult to produce. Therefore, in order to suppress moisture absorption in the air to maintain a low thermal conductivity, a step of modifying the surface of the silica aerogel to be hydrophobic is essentially required.

The surface modification of the present invention is performed by adding at least one surface modifier selected from the group consisting of trimethylchlorosilane (TMCS), hexamethyldisilazane (HMDS), methyltrimethoxysilane, trimethylethoxysilane, ethyltriethoxysilane, phenyltriethoxysilane, and polydimethylsiloxane, and more specifically, may be performed by adding hexamethyldisilazane (HMDS).

Hereinafter, a hydrophobic silica aerogel may be produced through a drying process in which the solvent is removed while maintaining the pore structure of the surface-modified hydrophobic silica aerogel without any change. The drying process may be performed by an atmospheric pressure drying or supercritical drying process.

Carbon dioxide ($CO_2$) is in a gaseous state at room temperature and atmospheric pressure, but when exceeding the limit of a certain temperature and high pressure, called as a supercritical point, a vaporization process does not occur, thus becoming a supercritical state in which the gas and the liquid may not be distinguished from each other, and carbon dioxide in this critical state is called as supercritical carbon dioxide.

Supercritical carbon dioxide has a molecular density close to that of a liquid, but has a low viscosity, thus a property close to a gas, and has a high diffusion rate and a high thermal conductivity, so that the drying efficiency is high and thus the drying process time may be shortened.

In the supercritical drying process, the aged silica gel is placed into a supercritical drying reactor, followed by filling $CO_2$ in the liquid state and performing a solvent substitution process in which an alcohol solvent inside the silica aerogel is substituted with $CO_2$. Thereafter, the mixture is heated to 40 to 50° C. at a certain heating rate, specifically at a rate of 0.1° C./min to 1° C./min and then maintained at more than a pressure in which carbon dioxide becomes supercritical, specifically at a pressure of 100 bar to 150 bar, thereby being maintained for a certain period of time, specifically for 20 minutes to 1 hour, in the supercritical state. In General, carbon dioxide becomes supercritical at a temperature of 31° C. and a pressure of 73.8 bar. After the carbon dioxide is maintained for 2 to 12 hours, specifically 2 to 6 hours at a certain temperature and pressure in which carbon dioxide becomes supercritical, the pressure is slowly removed to complete the supercritical drying process, so that a silica aerogel blanket may be produced.

In addition, the atmospheric pressure drying process may be performed according to a conventional method such as natural drying under atmospheric pressure (1±0.3 atm).

Meanwhile, a production method according to an embodiment of the present invention may further perform a washing step before the drying. The washing is a step of removing impurities (sodium ions, unreacted materials, by-products, etc.) generated during the reaction, and residual ammonium which reacts with $CO_2$ during the supercritical drying to generate an ammonium carbonate salt, thereby obtaining a high purity hydrophobic silica aerogel. The washing may be carried out by a dilution process or an exchange process using a nonpolar organic solvent.

Further, the present invention may provide an aerogel blanket produced by the production method of the present invention. In addition, the thermal conductivity of the aerogel blanket may be 14 mW/mK or less.

On the other hand, the insulation properties of the aerogel blanket increase as the content of the silica aerogel in the blanket is higher. However, when the content is too high, due to the low strength and adhesive force of the silica aerogel itself, the strength and the adhesive force may be deteriorated during a subsequent process for production of the blanket, so that it is preferable to appropriately adjust the content of the silica aerogel contained in the blanket in consideration of the use of the blanket and the like. Specifically, the silica aerogel in the present invention may be contained in an amount of 20 wt % to 80 wt %, based on the total weight of the aerogel blanket.

According to the production method of the present invention in which the additive of the specific composition and form represented by Formula 1 is added as described above, the effect capable of reducing the generation of dust may be obtained while having excellent flame retardancy and excellent thermal conductivity.

Hereinafter, the examples of the present invention will be described in detail so that those skilled in the art can easily carry out the present invention. The present invention may, however, be embodied in different forms and will not be limited to the embodiments set forth herein.

Example 1

Tetraethyl orthosilicate, ethanol, water, and HCl were mixed to prepare pre-hydrolyzed TEOS having a $SiO_2$ concentration of 20%. Water and ethanol were mixed with the mixture again to prepare an alkoxide silica sol having a silica concentration of 4%. Thereafter, a plate type $Mg(OH)_2 \cdot MgO \cdot SiO_2$ powder was added to the silica sol in an amount of 2.5 parts by weight of the silica concentration. After the addition of the ammonia catalyst to the prepared silica sol, a polyester fiber was impregnated and gelation was carried out. In this case, it took about 10 minutes to complete gelation. After aging for about 1 hour, a surface modification with hexamethyldisilazane (HMDS) was performed. When the surface modification was completed, the silica gel-fiber composite was placed into a 7.2 L supercritical extractor and $CO_2$ was injected. Then, the temperature in the extractor was heated to 50° C. for 1 hour and 20 minutes, and when reaching 100 bar at 50° C., $CO_2$ was continuously injected at a rate of 0.4 L/min for 150 minutes. At this time, ethanol was recovered through the bottom of a separator. The aerogel blanket was then produced by venting $CO_2$ for 2 hours.

Example 2

An aerogel blanket was produced in the same manner as in Example 1, except that 5.0 parts by weight of an additive was added in Example 1.

Example 3

An aerogel blanket was produced in the same manner as in Example 1, except that 7.5 parts by weight of an additive was added in Example 1.

Example 4

An aerogel blanket was produced in the same manner as in Example 1, except that 10.0 parts by weight of an additive was added in Example 1.

Comparative Example 1

An aerogel blanket was produced in the same manner as in Example 1, except that an additive was not added in Example 1.

Comparative Example 2

An aerogel blanket was produced in the same manner as in Example 1, except that 5.0 parts by weight of spherical $Mg(OH)_2$ was added as an additive in Example 1.

Comparative Example 3

An aerogel blanket was produced in the same manner as in Example 1, except that an additive of a spherical powder other than a plate type was added in Example 1.

TABLE 1

| | Additive type and content | Type | Flame retardancy | Dust measurement (weight reduction rate wt %) | Thermal conductivity (mW/mK) |
|---|---|---|---|---|---|
| Example 1 | $Mg(OH)_2 \cdot MgO \cdot SiO_2$ 2.5 parts by weight | plate | ○ | 6.5 | 14.0 |
| Example 2 | $Mg(OH)_2 \cdot MgO \cdot SiO_2$ 5.0 parts by weight | plate | ○ | 6.4 | 13.7 |
| Example 2 | $Mg(OH)_2 \cdot MgO \cdot SiO_2$ 7.5 parts by weight | plate | ○ | 6.6 | 13.7 |
| Example 3 | $Mg(OH)_2 \cdot MgO \cdot SiO_2$ 10.0 parts by weight | Plate | ○ | 6.8 | 14.2 |
| Comparative Example 1 | — | — | X | 7.5 | 14.8 |
| Comparative Example 2 | $Mg(OH)_2$ 5.0 parts by weight | Sphere | ○ | 9.2 | 14.7 |
| Comparative Example 3 | $Mg(OH)_2 \cdot MgO \cdot SiO_2$ 5.0 parts by weight | Sphere | ○ | 9.4 | 14.4 |

Experimental Example 1: Flame Retardancy Measurement

After a wire was contacted with the aerogel blanket sample produced in Example 2 and Comparative Examples 1 to 3, whether or not smoke, odor and soot were generated was observed while heating the wire up to 1050° C. The results were shown in Table 1 and FIG. 2.

Figure 2:
FIG. 2 is a photograph showing the results of the flame retardancy test of the aerogel blanket according to Examples and Comparative examples of the present invention.

As shown in FIG. 2, in Comparative Example 1 in which no flame retardant or other additives were added, it was observed that smoke and soot were most generated and flame appeared.

Meanwhile, in Comparative Example 2 in which $Mg(OH)_2$ was added, it was observed that flame retardancy was somewhat improved in comparison with Comparative Example 1 but a large amount of smoke, soot and flame appeared in comparison with Example 2 and Comparative Example 3 in which $Mg(OH)_2 \cdot MgO \cdot SiO_2$ was added.

From the experimental results, in Example 2 and Comparative Example 3 in which $Mg(OH)_2 \cdot MgO \cdot SiO_2$ of the present invention was added, it was seen that flame retardancy was improved. Among the above examples, in Example 2 in which a plate type $Mg(OH)_2 \cdot MgO \cdot SiO_2$ powder other than a spherical type was added, it was found that flame retardancy was most improved.

Thus, it was ascertained that the aerogel blanket produced by the production method of the present invention had excellent flame retardant performance.

Experimental Example 2: Dust Generation Experiment

An aerogel blanket produced according to Examples 1 to 4 and Comparative Examples 1 to 3 was cut to 12.5×12.5 cm, folded 14 times and then shaken 20 times to measure the weight change (weight reduction=(initial weight of aerogel blanket−weight of aerogel blanket after dust generation experiment)/(initial weight of aerogel blanket)×100%). The measured results were shown in Table 1 below.

As shown in Table 1, in the aerogel blanket in which no additive was added (Comparative Example 1), $Mg(OH)_2$ was added (Comparative Example 2), or a spherical $Mg(OH)_2 \cdot MgO \cdot SiO_2$ powder was added (Comparative Example 3), it was found that the weight of the aerogel blanket remarkably decreased by the dust generation experiment.

On the other hand, in Examples 1 to 4 of the present invention in which a plate type $Mg(OH)_2 \cdot MgO \cdot SiO_2$ powder was added, it was found that the weight reduction ratio of the aerogel blanket was remarkably decreased in comparison with Comparative Examples.

The above effect is obtained by the plate type additive crossing each other, thereby increasing the adhesive force of the aerogel to the blanket, and suggests that the generation of dust may be remarkably decreased in comparison with the aerogel blanket in which a conventional flame retardant or an additive having another type such as a spherical type was added.

Thus, it was ascertained that the method for producing an aerogel blanket of the present invention may produce a low-dust aerogel blanket.

Experimental Example 3: Thermal Conductivity Measurement

The Guarded Hot Plate (GHP) high-temperature thermal conductivity of the silica aerogel blanket produced in Examples 1 to 4 and Comparative Examples 1 to 3 was measured by using GHP 456 equipment of NETZSCH Co., and the results was shown in Table 1.

As shown in Table 1, in Examples 1 to 4 of the present invention in which a plate type $Mg(OH)_2.MgO.SiO_2$ powder was added, it was found that the thermal conductivity of the aerogel blanket was remarkably decreased as a whole in comparison with Comparative Examples.

Further, it was ascertained that Comparison Example 1 in which neither flame retardant nor other additives were added had a highest thermal conductivity, and thus it was found that the insulation performance was the worst.

On the other hand, in Comparison Example 2 in which $Mg(OH)_2$ was added, it was ascertained that the thermal conductivity was somewhat improved in comparison with Comparative Example 1, but the thermal conductivity was not significantly improved as compared with Examples 1 to 4 and Comparative Example 3 in which $Mg(OH)_2.MgO.SiO_2$ was added.

In addition, even when $Mg(OH)_2.MgO.SiO_2$ having the same composition was added as an additive, in Comparison Example 3 in which the type of the additive powder was spherical, it was ascertained that the effect of improving the thermal conductivity was small in comparison with Example 2 in which the same amount of the plate type powder was added.

Thus, it was found that the aerogel blanket produced by the method for producing the aerogel blanket of the present invention, which was characterized by adding $Mg(OH)_2.MgO.SiO_2$ of the plate type powder, had excellent insulation performance.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for producing an aerogel blanket, the method comprising the steps of:
   1) mixing a silica precursor, water, and alcohol to prepare a silica sol;
   2) adding an additive represented by Formula 1 below to the silica sol;
   3) mixing a basic catalyst with the silica sol mixed with the additive and then impregnating a blanket substrate;
   4) performing a gelation reaction of the silica sol in a state in which the silica sol is impregnated into the blanket substrate; and
   5) thereafter, performing surface modifying and drying, $$M(OH)_x.M_yO_z.SiO_2 \qquad \text{[Formula 1]}$$

wherein:
M is at least one metal element selected from the group consisting of Mg, Ca and Al; and
x, y and z are positive integers of 3 or less.

2. The method of claim 1, wherein the additive is $Mg(OH)_2.MgO.SiO_2$.

3. The method of claim 1, wherein the additive is a plate powder.

4. The method of claim 1, wherein the additive is used in an amount of 2.5 to 20 parts by weight, based on 100 parts by weight of the silica precursor.

5. The method of claim 1, wherein the basic catalyst is at least one selected from the group consisting of ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, colin, monoethanolamine, diethanolamine, 2-aminoethanol, 2-(ethylamino)ethanol, 2-(methylamino)ethanol, N-methyldiethanolamine, dimethylaminoethanol, diethylaminoethanol, nitrilotriethanol, 2-(2-aminoethoxy)ethanol, 1-amino-2-propanol, triethanolamine, monopropanolamine, and dibutanolamine.

6. The method of claim 1, wherein the blanket substrate is at least one selected from the group consisting of films, sheets, nets, fibers, porous bodies, foams, and nonwoven fabrics.

7. The method of claim 1, further comprising, after step 4), a step of performing an aging.

8. The method of claim 1, wherein the surface modification is performed by adding at least one surface modifier selected from the group consisting of trimethylchlorosilane (TMCS), hexamethyldisilazane (HMDS), methyltrimethoxysilane, trimethylethoxysilane, ethyltriethoxysilane, phenyltriethoxysilane, and polydimethylsiloxane.

9. The method of claim 1, wherein the drying is performed by a supercritical drying or ambient drying process.

10. An aerogel blanket produced by the method of claim 1.

11. The aerogel blanket of claim 10, wherein the thermal conductivity of the aerogel blanket is 14 mW/mK or less.

* * * * *